(12) United States Patent
Reddy et al.

(10) Patent No.: US 9,479,050 B1
(45) Date of Patent: Oct. 25, 2016

(54) HIGH-EFFICIENCY FRACTIONAL PUMP

(71) Applicant: SANDISK TECHNOLOGIES INC., Plano, TX (US)

(72) Inventors: Gooty Sukumar Reddy, Andhra Pradesh (IN); Sridhar Yadala, Karnataka (IN)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/751,996

(22) Filed: Jun. 26, 2015

(51) Int. Cl.
*H03K 3/01* (2006.01)
*H02M 3/07* (2006.01)
*H02M 1/00* (2006.01)

(52) U.S. Cl.
CPC ....... *H02M 3/07* (2013.01); *H02M 2001/0032* (2013.01); *H02M 2003/075* (2013.01); *H02M 2003/077* (2013.01)

(58) Field of Classification Search
CPC .. H02M 3/00; H02M 3/07; H02M 2003/077; H02M 2003/075; H02M 2001/0041; H02M 2001/0032
USPC ......................................... 327/534–538, 589
See application file for complete search history.

(56) References Cited

U.S. PATENT DOCUMENTS

| | | | | |
|---|---|---|---|---|
| 5,831,469 A | * | 11/1998 | Menichelli | G11C 5/145 307/110 |
| 8,311,243 B2 | * | 11/2012 | Tucker | H02M 3/07 330/10 |
| 9,136,755 B2 | * | 9/2015 | Lesso | H02M 3/07 |
| 2011/0205779 A1 | * | 8/2011 | Sasaki | G11C 5/145 365/148 |
| 2013/0229841 A1 | * | 9/2013 | Giuliano | H02M 3/158 363/60 |

\* cited by examiner

*Primary Examiner* — Dinh T Le
(74) *Attorney, Agent, or Firm* — Vierra Magen Marcus LLP

(57) ABSTRACT

Methods and systems for generating voltages greater than a supply voltage are described. In some embodiments, a charge pump system may generate a boosted output voltage greater than the supply voltage using one or more charge pump stages that are arranged in series between the supply voltage and the boosted output voltage. A charge pump stage of the one or more charge pump stages may include a plurality of boosting capacitors that are arranged in series and charged to a charging voltage during a charging phase. During the charging phase, each boosting capacitor of the plurality of boosting capacitors may be charged to a fraction of the charging voltage applied across all of the plurality of boosting capacitors. After the charging phase, the plurality of boosting capacitors may be arranged in parallel and each boosting capacitor of the plurality of boosting capacitors may be boosted during a boosting phase.

20 Claims, 13 Drawing Sheets

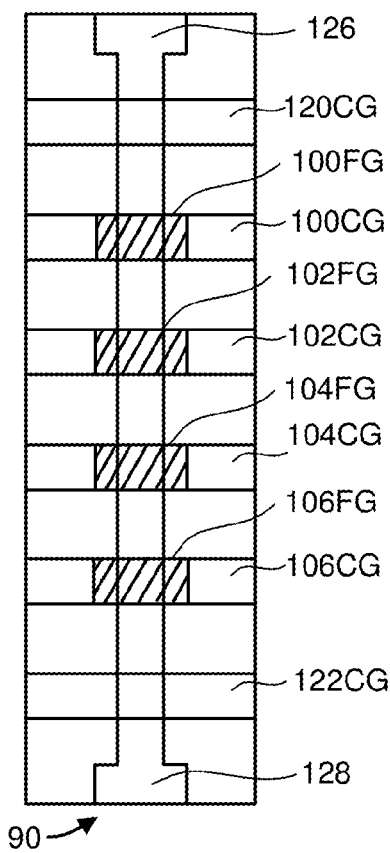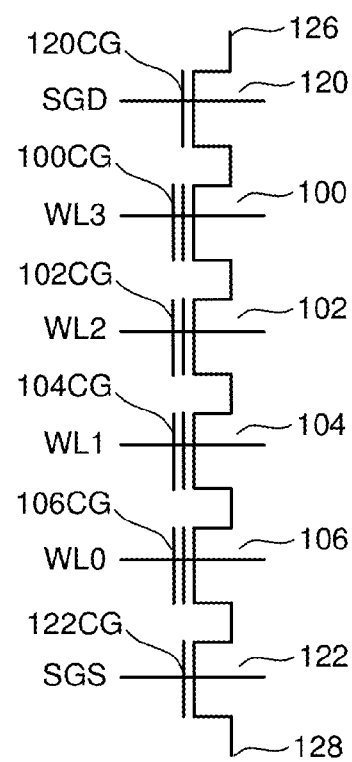
FIG. 1   FIG. 2

HIGH-EFFICIENCY FRACTIONAL PUMP

BACKGROUND

Semiconductor memory is widely used in various electronic devices such as cellular telephones, digital cameras, personal digital assistants, medical electronics, mobile computing devices, and non-mobile computing devices. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory) and Electrically Erasable Programmable Read-Only Memory (EEPROM).

Both flash memory and EEPROM utilize floating-gate transistors. For each floating-gate transistor, a floating gate is positioned above and insulated from a channel region of the floating-gate transistor. The channel region is positioned between source and drain regions of the floating-gate transistor. A control gate is positioned above and insulated from the floating gate. The threshold voltage of the floating-gate transistor may be controlled by setting the amount of charge stored on the floating gate. The amount of charge on the floating gate is typically controlled using Fowler-Nordheim (F-N) tunneling or hot-electron injection. The ability to adjust the threshold voltage allows a floating-gate transistor to act as a non-volatile storage element or memory cell. In some cases, more than one data bit per memory cell (i.e., a multi-level or multi-state memory cell) may be provided by programming and reading multiple threshold voltages or threshold voltage ranges.

NAND flash memory structures typically arrange multiple floating-gate transistors in series with and between two select gates. The floating-gate transistors in series and the select gates may be referred to as a NAND string. In recent years, NAND flash memory has been scaled in order to reduce cost per bit. However, as process geometries shrink, many design and process challenges are presented. These challenges include increased variability in transistor characteristics over process, voltage, and temperature variations.

BRIEF DESCRIPTION OF THE DRAWINGS

FIG. 1 depicts one embodiment of a NAND string.

FIG. 2 depicts one embodiment of the NAND string of FIG. 1 using a corresponding circuit diagram.

DETAILED DESCRIPTION

Figure 3A:
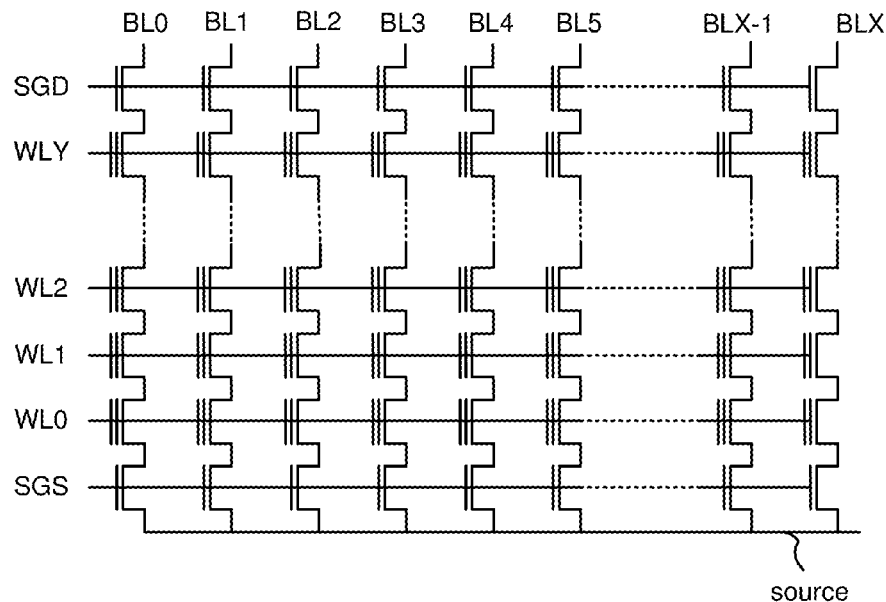
FIG. 3A depicts one embodiment of a memory block including a plurality of NAND strings.

Technology is described for generating voltages greater than a supply voltage provided to an integrated circuit (e.g., the supply voltage may be provided via an external voltage source or a regulator located outside of the integrated circuit) using a fractional charge pump system. In some embodiments, a charge pump system may generate a boosted output voltage that is greater than the supply voltage using one or more charge pump stages that are arranged in series between the supply voltage and the boosted output voltage. In one example, the boosted output voltage may be used by one or more on-chip voltage regulators to provide various voltage references (e.g., selected word line voltages, unselected word line voltages, selected bit line voltages, and unselected bit line voltages) to a memory array during a memory operation (e.g., an erase operation, a read operation, a programming operation, a program verify operation, or an erase verify operation). A charge pump stage of the one or more charge pump stages may include a plurality of boosting capacitors that are arranged in series and charged to a charging voltage during a charging phase. During the charging phase, each boosting capacitor of the plurality of boosting capacitors may be charged to a fraction of the charging voltage applied across all of the plurality of boosting capacitors depending on the capacitive voltage divider formed by the plurality of boosting capacitors in series. In one example, if the plurality of boosting capacitors comprises two boosting capacitors that are arranged in series and the charging voltage is 4V during the charging phase, then each of the two boosting capacitors may be charged up to 2V (i.e., half of the 4V placed across the two boosting capacitors). After the charging phase, the plurality of boosting capacitors may then be arranged in parallel and each boosting capacitor of the plurality of boosting capacitors may be boosted during a boosting phase. One benefit of charging each of the plurality of boosting capacitors to a fractional voltage prior to boosting is that power efficiency may be improved for the charge pump system in situations where a maximum output voltage is not required.

In some embodiments, a configuration of the plurality of boosting capacitors during the charging phase may be set depending on a target output voltage (or the desired output voltage) of the charge pump system. The configuration may comprise a series configuration of the plurality of boosting capacitors or a parallel configuration of the plurality of boosting capacitors. In one example, if the target output voltage of the charge pump system is above a voltage threshold (e.g., above 3V), then the plurality of boosting capacitors may be placed in parallel during the charging phase. However, if the target output voltage of the charge pump system is below the voltage threshold, then the plurality of boosting capacitors may be placed in series during the charging phase. In some cases, the number of boosting capacitors placed in series during the charging phase may depend on the target output voltage. In one example, if the target output voltage is 3V, then two boosting capacitors may be placed in series during the charging phase. However, if the target output voltage is 2V or another voltage less than 3V, then three boosting capacitors may be placed in series during the charging phase. Thus, as the target output voltage is reduced, the number of boosting capacitors arranged in series during the charging phase may be increased.

In another embodiment, the configuration of the plurality of boosting capacitors during the charging phase may be set depending on the output current load to be supplied by the charge pump system. In one example, if the output current load of the charge pump system is above a current threshold (e.g., above 1 mA), then the plurality of boosting capacitors may be placed in parallel during the charging phase. However, if the output current load of the charge pump system is below the current threshold, then the plurality of boosting capacitors may be placed in series during the charging phase.

In some embodiments, a charge pump system may generate a boosted output voltage that is greater than a supply voltage (e.g., VDD or VCC) using a plurality of charge pump stages that are cascaded in series between the supply voltage and the boosted output voltage. Each charge pump stage of the plurality of charge pump stages may include a plurality of boosting capacitors (i.e., two or more boosting capacitors). During a charging phase, the plurality of boosting capacitors may be configured such that a first set of boosting capacitors of the plurality of boosting capacitors is arranged in series. In some cases, during the charging phase, the plurality of boosting capacitors may be configured such that a first set of boosting capacitors is arranged in series and a second set of boosting capacitors of the plurality of boosting capacitors is arranged in parallel. In one example, the plurality of boosting capacitors may comprise four boosting capacitors and the configuration of the four boosting capacitors during the charging phase may comprise a first set of two parallel boosting capacitors in series with a second set of two parallel boosting capacitors. During the charging phase, the plurality of boosting capacitors may be configured such that each boosting capacitor of the plurality of boosting capacitors may be charged to a fraction of a charging voltage applied across the plurality of boosting capacitors (i.e., each boosting capacitor may be charged up to a voltage less than the charging voltage depending on a capacitive voltage divider formed by the plurality of boosting capacitors). After the charging phase, the plurality of boosting capacitors may be arranged in parallel and each boosting capacitor of the plurality of boosting capacitors may be boosted during a boosting phase in order to transfer charge to the output of the charge pump system.

The methods and systems described herein for generating voltages greater than a supply voltage may be used for generating on-chip voltages that are used with electronic circuits (e.g., digital or analog circuits) located on an integrated circuit. As examples, the integrated circuit may comprise a memory chip (e.g., DRAM, SRAM, Flash memory, etc.), a programmable logic device (e.g., FPGA or CPLD), a microprocessor, a microcontroller, a DSP, an ASIC, or an RF integrated circuit.

The charge pump systems described herein may be used for generating voltages used by a non-volatile storage system. In one embodiment, a non-volatile storage system may include one or more two-dimensional arrays of non-volatile memory cells. The memory cells within a two-dimensional memory array may form a single layer of memory cells and may be selected via control lines (e.g., word lines and bit lines) in the X and Y directions. In another embodiment, a non-volatile storage system may include one or more monolithic three-dimensional memory arrays in which two or more layers of memory cells may be formed above a single substrate without any intervening substrates. In some cases, a three-dimensional memory array may include one or more vertical columns of memory cells located above and orthogonal to a substrate. In one example, a non-volatile storage system may include a memory array with vertical bit lines or bit lines that are arranged orthogonal to a semiconductor substrate. In another example, the memory array may include a bit cost scalable (BiCS) NAND structure or a vertical NAND structure. The substrate may comprise a silicon substrate. The memory array may include rewriteable non-volatile memory cells, wherein each memory cell includes a reversible resistance-switching element without an isolation element in series with the reversible resistance-switching element (e.g., no diode in series with the reversible resistance-switching element).

In some embodiments, a non-volatile storage system may include a non-volatile memory that is monolithically formed in one or more physical levels of arrays of memory cells having an active area disposed above a silicon substrate. The non-volatile storage system may also include circuitry associated with the operation of the memory cells (e.g., decoders, state machines, page registers, or control circuitry for controlling the reading or programming of the memory cells). The circuitry associated with the operation of the memory cells may be located above the substrate or located within the substrate.

In some embodiments, a non-volatile storage system may include a monolithic three-dimensional memory array. The monolithic three-dimensional memory array may include one or more levels of memory cells. Each memory cell within a first level of the one or more levels of memory cells may include an active area that is located above a substrate (e.g., above a single-crystal substrate or a crystalline silicon substrate). In one example, the active area may include a semiconductor junction (e.g., a P-N junction). The active area may include a portion of a source or drain region of a transistor. In another example, the active area may include a channel region of a transistor.

FIG. 1 depicts one embodiment of a NAND string 90. FIG. 2 depicts one embodiment of the NAND string of FIG. 1 using a corresponding circuit diagram. As depicted, NAND string 90 includes four transistors, 100, 102, 104, and 106, in series between a first select gate 120 (i.e., a drain-side select gate) and a second select gate 122 (i.e., a source-side select gate). Select gate 120 connects the NAND string 90 to a bit line 126. Select gate 122 connects the NAND string 90 to a source line 128. Select gate 120 is controlled by applying the appropriate voltage to control gate 120CG (i.e., via select line SGD of FIG. 2). Select gate 122 is controlled by applying the appropriate voltage to control gate 122CG (i.e., via select line SGS of FIG. 2). Each of the transistors 100, 102, 104, and 106 includes a control gate and a floating gate. For example, transistor 100 includes control gate 100CG and floating gate 100FG, transistor 102 includes control gate 102CG and floating gate 102FG, transistor 104 includes control gate 104CG and floating gate 104FG, and transistor 106 includes control gate 106CG and floating gate 106FG. Control gates 100CG, 102CG, 104CG, and 106CG are connected to word lines WL3, WL2, WL1, and WL0, respectively.

Note that although FIGS. 1 and 2 show four floating-gate transistors in the NAND string, the use of four floating-gate transistors is only provided as an example. A NAND string may have less than or more than four floating-gate transistors (or memory cells). For example, some NAND strings may include 16 memory cells, 32 memory cells, 64 memory cells, 128 memory cells, etc. The discussion herein is not limited to any particular number of memory cells in a NAND string. One embodiment uses NAND strings with 66 memory cells, where 64 memory cells are used to store data and two of the memory cells are referred to as dummy memory cells because they do not store data.

A typical architecture for a flash memory system using a NAND flash memory structure includes a plurality of NAND strings within a memory block. A memory block may comprise a unit of erase. In some cases, the NAND strings within a memory block may share a common well (e.g., a P-well). Each NAND string may be connected to a common source line by its source-side select gate (e.g., controlled by select line SGS) and connected to its associated bit line by its drain-side select gate (e.g., controlled by select line SGD). Typically, each bit line runs on top of (or over) its associated NAND string in a direction perpendicular to the word lines and is connected to a sense amplifier.

In some embodiments, during a programming operation, storage elements that are not to be programmed (e.g., storage elements that have previously completed programming to a target data state) may be inhibited or locked out from programming by boosting associated channel regions (e.g., self-boosting the channel regions via word line coupling). An unselected storage element (or unselected NAND string) may be referred to as an inhibited or locked out storage element (or inhibited NAND string) as it is inhibited or locked out from programming during a given programming iteration of a programming operation.

Although technology using NAND-type flash memory may be described herein, the technology disclosed herein may also be applied to other types of non-volatile storage devices and architectures (e.g., NOR-type flash memory). Moreover, although technology using floating-gate transistors is described herein, the technology described herein may also be applied to or used with other memory technologies including those that employ charge trapping, phase-change (e.g., chalcogenide materials), or state-change materials.

FIG. 3A depicts one embodiment of a memory block including a plurality of NAND strings. As depicted, each NAND string includes (Y+1) memory cells. Each NAND string is connected to one bit line out of (X+1) bit lines on the drain side (i.e., one bit line of bit lines BL0-BLX) via a drain-side select gate controlled by the drain-side selection signal SGD. Each NAND string is connected to a source line (source) via a source-side select gate controlled by source-side selection signal SGS. In one embodiment, the source-side select gate controlled by source-side selection signal SGS and the drain-side select gate controlled by the drain-side selection signal SGD may comprise transistors without floating gates or transistors that include a floating gate structure.

In one embodiment, during a programming operation, when programming a memory cell, such as a NAND flash memory cell, a program voltage may be applied to the control gate of the memory cell and the corresponding bit line may be grounded. These programming bias conditions may cause electrons to be injected into the floating gate via field-assisted electron tunneling, thereby raising the threshold voltage of the memory cell. The program voltage applied to the control gate during a program operation may be applied as a series of pulses. In some cases, the magnitude of the programming pulses may be increased with each successive pulse by a predetermined step size. Between programming pulses, one or more verify operations may be performed. During the programming operation, memory cells that have reached their intended programming states may be locked out and inhibited from programming by boosting the channel regions of the program inhibited memory cells.

In one embodiment, memory cells may be erased by raising the p-well to an erase voltage (e.g., 20 volts) for a sufficient period of time and grounding the word lines of a selected block of memory cells while the source and bit lines are floating. These erase bias conditions may cause electrons to be transferred from the floating gate through the tunneling oxide, thereby lowering the threshold voltage of the memory cells within the selected block. In some cases, an erase operation may be performed on an entire memory plane, on individual blocks within a memory plane, or another unit of memory cells.

In some embodiments, during verify operations and/or read operations, a selected word line may be connected (or biased) to a voltage, a level of which is specified for each read and verify operation in order to determine whether a threshold voltage of a particular memory cell has reached such level. After applying the word line voltage, the conduction current of the memory cell may be measured (or sensed) to determine whether the memory cell conducted a sufficient amount of current in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell.

There are many ways to measure the conduction current of a memory cell during a read or verify operation. In one example, the conduction current of a memory cell may be measured by the rate it discharges or charges a dedicated capacitor in a sense amplifier. In another example, the conduction current of the selected memory cell allows (or fails to allow) the NAND string that included the memory cell to discharge a voltage on the corresponding bit line. The voltage of the bit line (or the voltage across a dedicated capacitor in a sense amplifier) may be measured after a period of time to determine whether the bit line has been discharged by a particular amount or not.

Figure 3B:
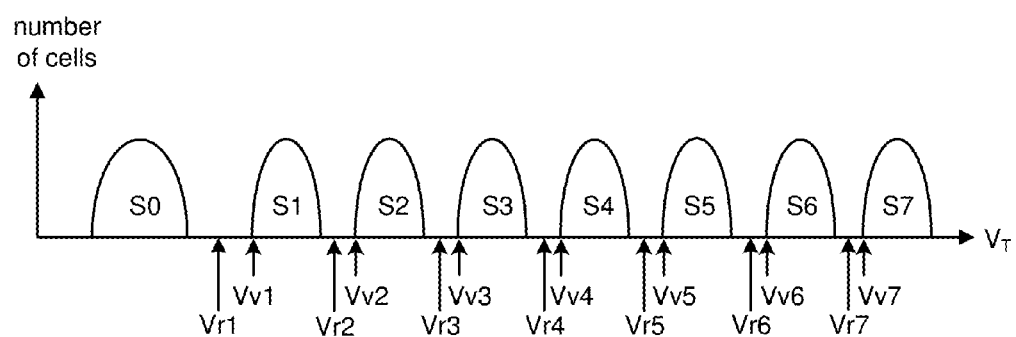
FIG. 3B depicts one embodiment of possible threshold voltage distributions for a three-bit-per-cell memory cell.

FIG. 3B depicts one embodiment of possible threshold voltage distributions (or data states) for a three-bit-per-cell memory cell (i.e., the memory cell may store three bits of data). Other embodiments, however, may use more than or less than three bits of data per memory cell (e.g., such as four or more bits of data per memory cell). At the end of a successful programming process (with verification), the threshold voltages of memory cells within a memory page or memory block should be within one or more threshold voltage distributions for programmed memory cells or within a distribution of threshold voltages for erased memory cells, as appropriate.

As depicted, each memory cell may store three bits of data; therefore, there are eight valid data states S0-S7. In one embodiment, data state S0 is below 0 volts and data states S1-S7 are above 0 volts. In other embodiments, all eight data states are above 0 volts, or other arrangements can be implemented. In one embodiment, the threshold voltage distribution S0 is wider than distributions S1-S7.

Each data state S0-S7 corresponds to a unique value for the three bits stored in the memory cell. In one embodiment, S0=111, S1=110, S2=101, S3=100, S4=011, S5=010, S6=001 and S7=000. Other mappings of data to states S0-S7 can also be used. In one embodiment, all of the bits of data stored in a memory cell are stored in the same logical page. In other embodiments, each bit of data stored in a memory cell corresponds to different pages. Thus, a memory cell storing three bits of data would include data in a first page, a second page, and a third page. In some embodiments, all of the memory cells connected to the same word line would store data in the same three pages of data. In some embodiments, the memory cells connected to a word line can be grouped into different sets of pages (e.g., by odd and even bit lines).

In some example implementations, the memory cells will be erased to state S0. From state S0, the memory cells can be programmed to any of states S1-S7. Programming may be performed by applying a set of pulses with rising magnitudes to the control gates of the memory cells. Between pulses, a set of verify operations may be performed to determine whether the memory cells being programmed have reached their target threshold voltage (e.g., using verify levels Vv1, Vv2, Vv3, Vv4, Vv5, Vv6, and Vv7). Memory cells being programmed to state S1 will be tested to see if their threshold voltage has reached Vv1. Memory cells being programmed to state S2 will be tested to see if their threshold voltage has reached Vv2. Memory cells being programmed to state S3 will be tested to see if their threshold voltage has reached Vv3. Memory cells being programmed to state S4 will be tested to see if their threshold voltage has reached Vv4. Memory cells being programmed to state S5 will be tested to see if their threshold voltage has reached Vv5. Memory cells being programmed to state S6 will be tested to see if their threshold voltage has reached Vv6. Memory cells being programmed to state S7 will be tested to see if their threshold voltage has reached Vv7.

When reading memory cells that store three bits of data, multiple reads will be performed at read compare points Vr1, Vr2, Vr3, Vr4, Vr5, Vr6, and Vr7 to determine which state the memory cells are in. If a memory cell turns on in response to Vr1, then it is in state S0. If a memory cell turns on in response to Vr2 but does not turn on in response to Vr1, then it is in state S1. If a memory cell turns on in response to Vr3 but does not turn on in response to Vr2, then it is in state S2. If a memory cell turns on in response to Vr4 but does not turn on in response to Vr3, then it is in state S3. If a memory cell turns on in response to Vr5 but does not turn on in response to Vr4, then it is in state S4. If a memory cell turns on in response to Vr6 but does not turn on in response to Vr5, then it is in state S5. If a memory cell turns on in response to Vr7 but does not turn on in response to Vr6, then it is in state S6. If a memory cell does not turn on in response to Vr7, then it is in state S7.

Figure 3C:
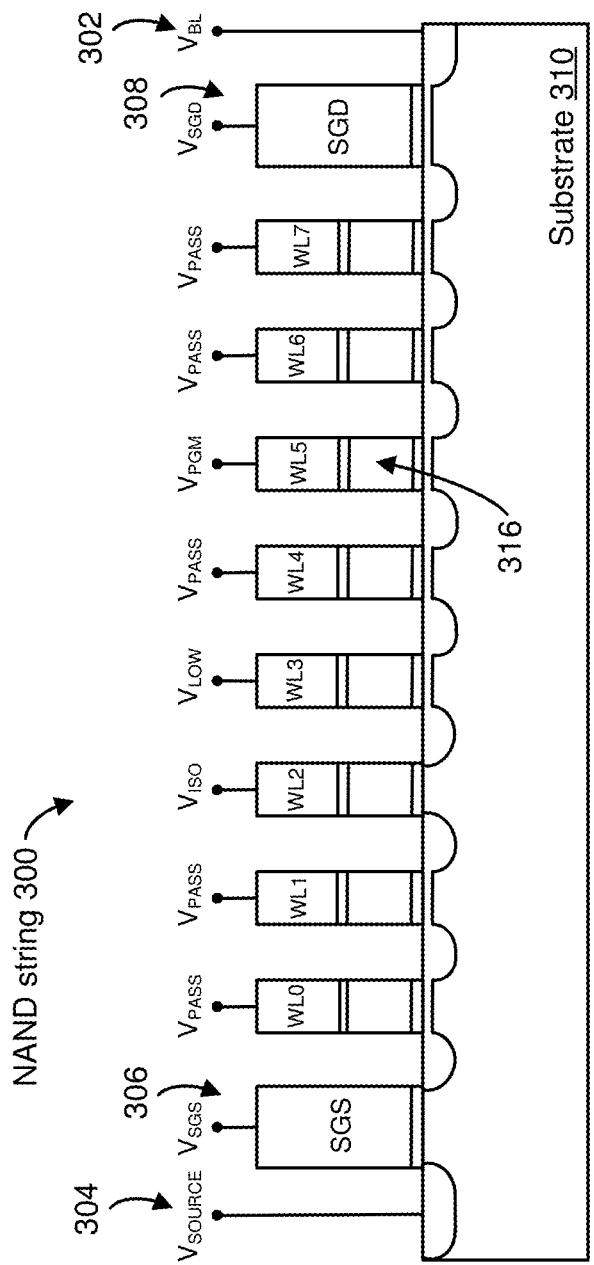
FIG. 3C depicts one embodiment of a NAND string during a programming operation.

FIG. 3C depicts one embodiment of a NAND string 300 during a programming operation. When programming a storage element (e.g., the storage element 316 associated with WL5) of the NAND string 300, a programming voltage may be applied to the selected word line associated with the storage element and a low voltage (e.g., ground) may be applied to the bit line associated with the storage element. As depicted, the NAND string 300 includes a source-side select gate 306, a drain-side select gate 308, and eight word lines WL0-WL7 formed above a substrate 310. $V_{SGS}$ may be applied to the source-side select gate 306 and $V_{SGD}$ may be applied to the drain-side select gate 308. The bit line 302 may be biased to $V_{BL}$ and the source line 304 may be biased to $V_{SOURCE}$. During a programming operation, a programming voltage, $V_{PGM}$, may be applied to selected word line WL5, which is associated with a selected storage element 316.

In one example of a boosting mode, when storage element 316 is the selected storage element, a relatively low voltage, $V_{LOW}$ (e.g., 2-6V) may be applied to a source-side word line (WL3), while an isolation voltage, $V_{ISO}$ (e.g., 0-4V) may be applied to another source-side word line (WL2), referred to as an isolation word line and a pass voltage, $V_{PASS}$, may be applied to the remaining word lines associated with NAND string 300 (in this case word lines WL0, WL1, WL4, WL6, and WL7). While the absolute values of $V_{ISO}$ and $V_{LOW}$ may vary over a relatively large and partly overlapping range, $V_{ISO}$ may be less than $V_{LOW}$. In some cases, $V_{ISO}$ may be less than $V_{LOW}$ which is less than $V_{PASS}$ which is less than $V_{PGM}$.

Figure 4A:
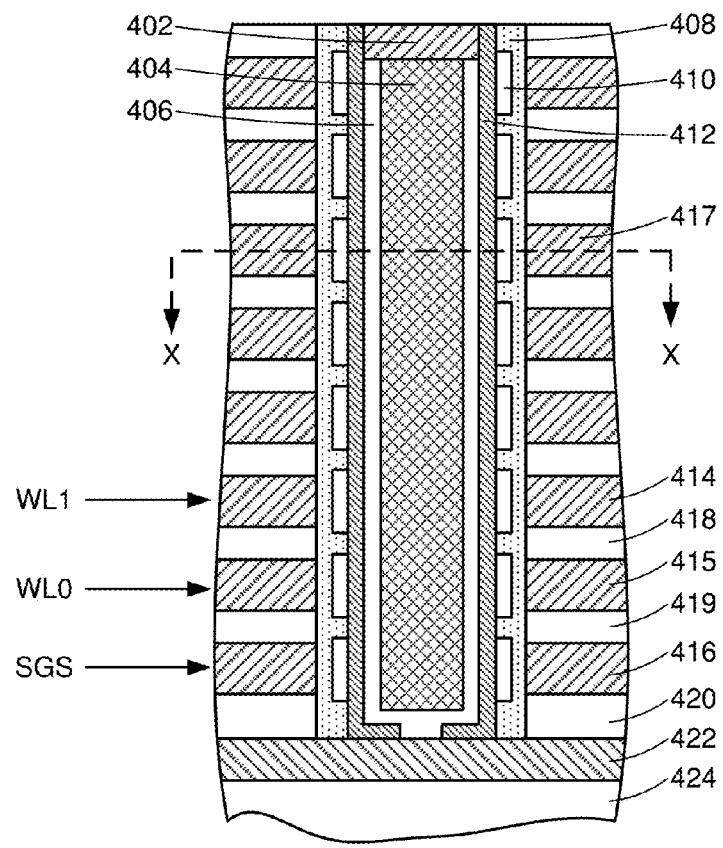
FIG. 4A depicts one embodiment of a vertical NAND structure.

FIG. 4A depicts one embodiment of a vertical NAND structure. The vertical NAND structure includes an inverted NAND string formed above the substrate 424 and oriented such that the inverted NAND string is orthogonal to the substrate 424. An inverted NAND string may comprise a NAND string that includes an inverted floating gate transistor with a tunneling oxide between a floating gate of the inverted floating gate transistor and a control gate of the inverted floating gate transistor. The arrangement of the tunneling oxide between the floating gate and the control gate allows the mechanism (e.g., F-N tunneling as the transport mechanism) for programming and/or erase of the inverted floating gate transistor to occur between the floating gate and the control gate rather than between the floating gate and the channel of the inverted floating gate transistor. The inverted NAND string may be arranged within a vertical memory hole that is etched through alternating layers of control gate material (e.g., tungsten, nitride, or polysilicon) and inter-gate insulator material (e.g., oxide or silicon dioxide). As depicted, the layers of control gate material include layer 417 and layers 414-416 and the layers of inter-gate insulator material include layers 418-420. The inter-gate insulator material layer 420 may be arranged above a source line layer 422 (e.g., doped polysilicon) that may be arranged above a substrate 424 (e.g., a silicon substrate). In some cases, a first word line (WL1) may correspond with control gate layer 414, a second word line (WL0) may correspond with control gate layer 415, and a source-side select gate line (SGS) may correspond with control gate layer 416.

In one embodiment, within the memory hole a tunneling layer material 408 (e.g., including a thin oxide), a floating gate material 410 (e.g., polysilicon), a dielectric layer 412 (e.g., oxide), and a channel layer material 406 (e.g., undoped polysilicon) may be deposited within the memory hole and arranged in order to form the inverted NAND string. As depicted in FIG. 4A, the tunneling layer material 408 is arranged within or inside of the memory hole. The tunneling layer material 408 may comprise a portion of a multi-layer dielectric stack such as an ONO dielectric stack, which includes alternating layers of silicon dioxide ("O") and silicon nitride ("N"). In some cases, the tunneling layer material 408 may comprise a high-K dielectric material (e.g., hafnium-based high-K dielectrics or hafnium oxide) that has a dielectric constant that is greater than that of silicon dioxide. In some cases, a core material layer 404 (e.g., oxide) may be formed within the memory hole. In other cases, the core material layer 404 may be omitted. A bit line contact layer 402 may be formed at the top of the memory hole and connect to or directly abut the channel layer material 406. The channel layer material 406 may connect to the source line layer 422 at the bottom of the memory hole. Thus, in this case, the bit line contact layer 402 connects to the inverted NAND string at the top of the memory hole and the source line contact layer 422 connects to the inverted NAND string at the bottom of the memory hole.

In one embodiment, the bit line contact layer 402 may comprise a material of a first conductivity type (e.g., n-type) and the source line contact layer 422 may comprise a material of a second conductivity type different from the first conductivity type (e.g., p-type). In one example, the bit line contact layer 402 may comprise an n-type material (e.g., n-type polysilicon) and the source line contact layer 422 may comprise a p-type material (e.g., p-type polysilicon). In another example, the bit line contact layer 402 may comprise a p-type material and the source line contact layer 422 may comprise an n-type material (e.g., n-type polysilicon). Thus, in some cases, the inverted NAND string may include an asymmetric source and drain that may be used to provide both an electron supply (via the n-type material) and a hole supply (via the p-type material) for memory operations (e.g., program, erase, and read operations) performed using the inverted NAND string. The memory operations may comprise n-channel operations and/or p-channel operations depending on the bias conditions applied to the inverted NAND string.

In one embodiment, an inverted NAND string may be formed using a core material layer (e.g., an oxide layer or other dielectric layer) that is arranged adjacent to a channel layer (e.g., an undoped polysilicon channel layer) that is arranged adjacent to a blocking layer (e.g., an oxide layer or other dielectric layer) that is arranged adjacent to a floating gate layer (or a charge trap layer) that is arranged adjacent to a tunneling layer (e.g., a thin oxide) that is arranged adjacent to a control gate layer (e.g., tungsten). The tunneling layer may have a thickness that is less than the thickness of the blocking layer.

Figure 4B:
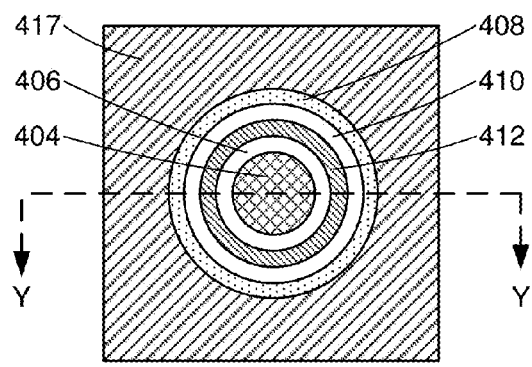
FIG. 4B depicts one embodiment of a cross-sectional view taken along line X-X of FIG. 4A.

FIG. 4B depicts one embodiment of a cross-sectional view taken along line X-X of FIG. 4A. As depicted, the inverted NAND string includes an inner core material layer 404 that is surrounded by the channel layer material 406 that is surrounded by the dielectric layer 412 that is surrounded by the floating gate material 410 that is surrounded by the tunneling layer material 408 that is surrounded by the control gate material layer 417. In one embodiment, FIG. 4A may depict a cross-sectional view taken along line Y-Y of FIG. 4B. In one embodiment, the inverted NAND string may be formed using a vertical cylindrical structure or a vertical tapered cylindrical structure. In this case, the dielectric material 412, floating gate material 410, tunneling layer material 408, and channel layer material 406 of the inverted NAND string may comprise vertical annular structures surrounding the core material layer 404. In another embodiment, the inverted NAND string may be formed using a vertical pillar structure or a vertical rectangular prism structure.

Figure 5A:
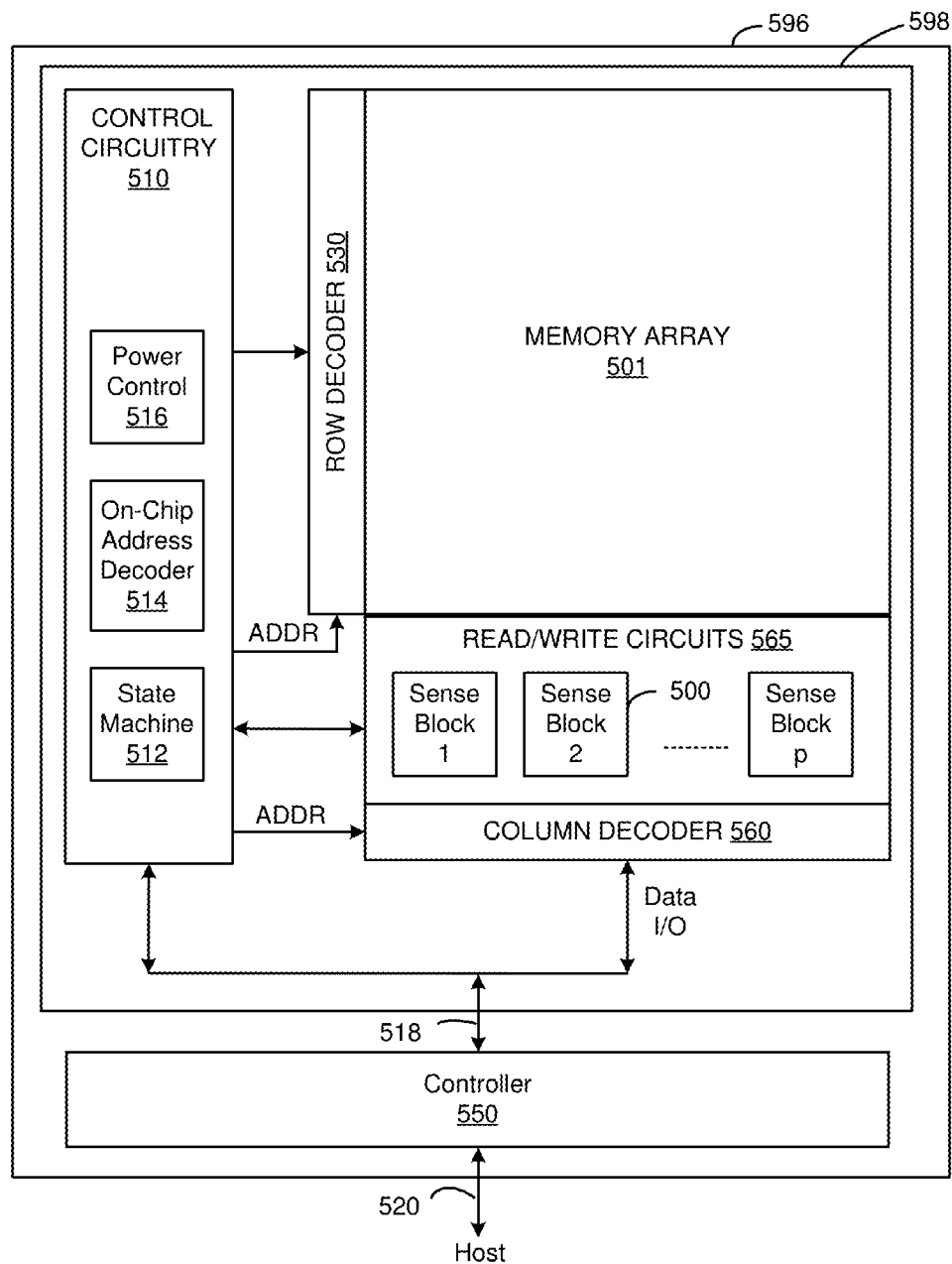
FIG. 5A depicts one embodiment of a non-volatile storage system.

FIG. 5A depicts one embodiment of a non-volatile storage system 596 including read/write circuits for reading and programming a page (or other unit) of memory cells (e.g., NAND multi-level cells) in parallel. As depicted, non-volatile storage system 596 includes a memory die 598 and controller 550. Memory die 598 includes a memory array 501 (e.g., a NAND flash memory array), control circuitry 510, row decoder 530, column decoder 560, and read/write circuits 565. In one embodiment, access to the memory array 501 by the various peripheral circuits (e.g., row decoders or column decoders) is implemented in a symmetric fashion, on opposite sides of the array, so that the densities of access lines and circuitry on each side are reduced by half. The memory array 501 is addressable by word lines via a row decoder 530 and by bit lines via a column decoder 560. Word lines and bit lines are examples of memory array control lines. The read/write circuits 565 include multiple sense blocks 500 that allow a page of storage elements to be read or programmed in parallel. In some cases, controller 550 may be integrated on the memory die 598. Commands and data are transferred between the host and controller 550 via lines 520 and between the controller 550 and the memory die 598 via lines 518.

The control circuitry 510 cooperates with the read/write circuits 565 to perform memory operations on the memory array 501. The control circuitry 510 includes a state machine 512, an on-chip address decoder 514, and a power control module 516. The state machine 512 provides chip-level control of memory operations. The on-chip address decoder 514 provides an address interface between that used by the host or a memory controller to the hardware address used by the decoders 530 and 560. The power control module 516 controls the power and voltages supplied to the word lines and bit lines during memory operations. In one embodiment, a power control module 516 includes one or more charge pumps that may generate voltages greater than the supply voltage.

In some embodiments, one or more of the components (alone or in combination), other than memory array 501, may be referred to as a managing or control circuit. For example, one or more managing or control circuits may include any one of or a combination of control circuitry 510, state machine 512, decoders 530/560, power control 516, sense blocks 500, read/write circuits 565, controller 550, and so forth. The one or more managing circuits or the one or more control circuits may perform or facilitate one or more memory array operations including erasing, programming, or reading operations.

In some embodiments, one or more managing or control circuits may be used for controlling the operation of a memory array, such as memory array 501. The one or more managing or control circuits may provide control signals to the memory array in order to perform a read operation and/or a write operation on the memory array. In one example, the one or more managing or control circuits may include any one of or a combination of control circuitry, state machine, decoders, sense amplifiers, read/write circuits, and/or controllers. The one or more control circuits may enable or facilitate one or more memory array operations including erasing, programming, or reading operations to be performed on the memory array. In one example, the one or more control circuits may comprise an on-chip memory controller for determining row and column addresses, word line and bit line addresses, memory array enable signals, and/or data latching signals.

In one embodiment, memory array 501 may be divided into a large number of blocks (e.g., blocks 0-1023, or another amount) of memory cells. As is common for flash memory systems, the block may be the unit of erase. That is, each block may contain the minimum number of memory cells that are erased together. Other units of erase can also be used. A block contains a set of NAND strings which are accessed via bit lines and word lines. Typically, all of the NAND strings in a block share a common set of word lines.

Each block may be divided into a particular number of pages. In one embodiment, a page may be the unit of programming. Other units of programming can also be used. One or more pages of data are typically stored in one row of memory cells. For example, one or more pages of data may be stored in memory cells connected to a common word line. In one embodiment, the set of memory cells that are connected to a common word line are programmed simultaneously. A page can store one or more sectors. A sector may include user data and overhead data (also called system data). Overhead data typically includes header information and Error Correction Codes (ECC) that have been calculated from the user data of the sector. The controller (or other component) calculates the ECC when data is being programmed into the array, and also checks it when data is being read from the array. Alternatively, the ECC and/or other overhead data may be stored in different pages, or even different blocks, than the user data to which they pertain. A sector of user data is typically 512 bytes, corresponding to the size of a sector in magnetic disk drives. A large number of pages form a block, anywhere from 8 pages, for example, up to 32, 64, 128 or more pages. Different sized blocks, pages, and sectors can also be used.

Figure 5B:
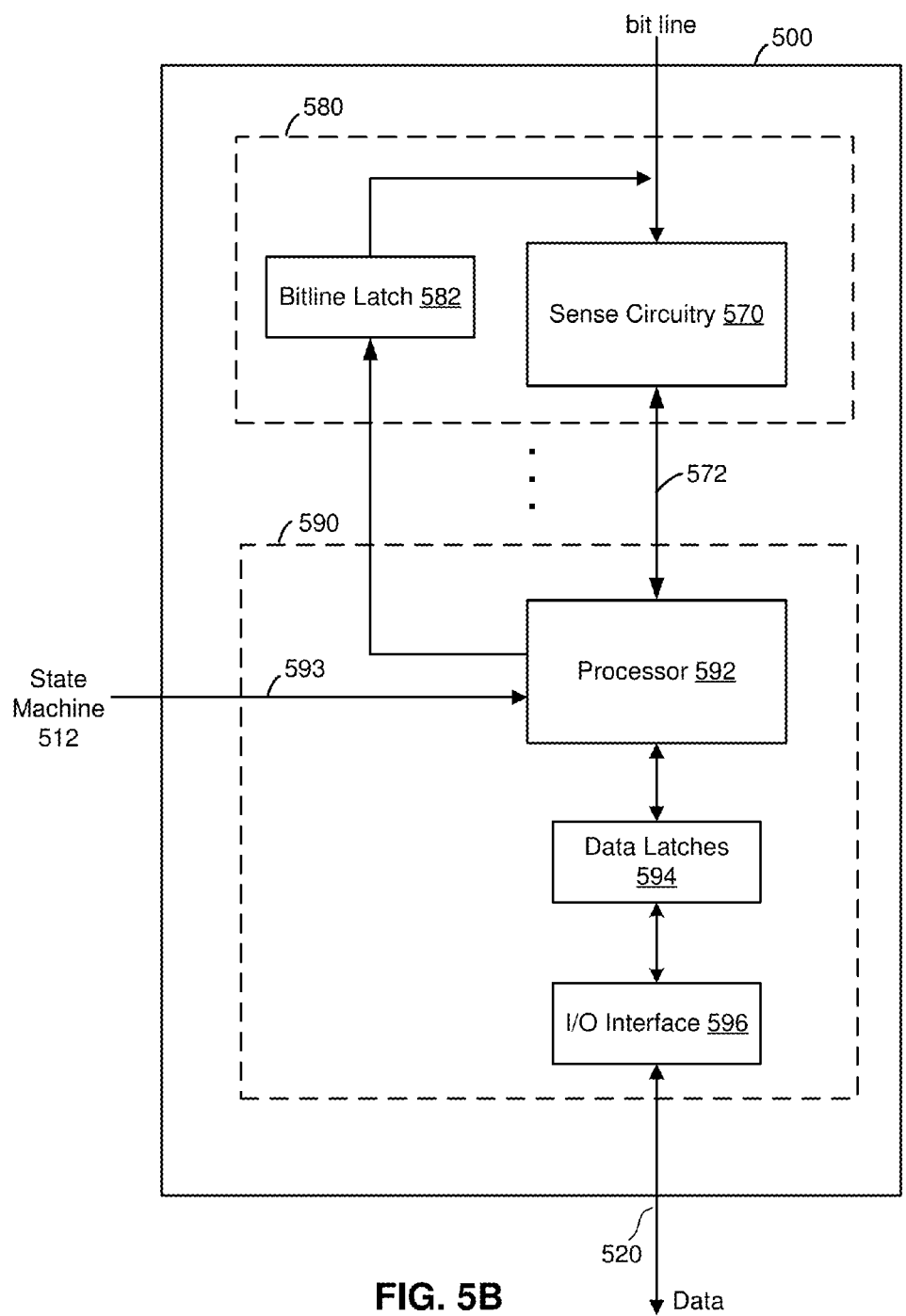
FIG. 5B depicts one embodiment of a sense block.

FIG. 5B depicts one embodiment of a sense block 500, such as sense block 500 in FIG. 5A. An individual sense block 500 may be partitioned into a core portion, referred to as a sense module 580, and a common portion 590. In one embodiment, there is a separate sense module 580 for each bit line and one common portion 590 for a set of multiple sense modules 580. In one example, a sense block will include one common portion 590 and eight sense modules 580. Each of the sense modules in a group will communicate with the associated common portion via a data bus 572.

Sense module 580 comprises sense circuitry 570 that determines whether a conduction current in a connected bit line is above or below a predetermined threshold level. Sense module 580 also includes a bit line latch 582 that is used to set a voltage condition on the connected bit line. For example, a predetermined state latched in bit line latch 582 may result in the connected bit line being pulled to a state designating program inhibit voltage (e.g., 1.5-3 V).

Common portion 590 comprises a processor 592, a set of data latches 594, and an I/O Interface 596 coupled between the set of data latches 594 and data bus 520. Processor 592 performs computations. For example, processor 592 may determine the data stored in the sensed storage element and store the determined data in the set of data latches. The set of data latches 594 may be used to store data bits determined by processor 592 during a read operation or to store data bits imported from the data bus 520 during a program operation. The imported data bits represent write data meant to be programmed into a memory array, such as memory array 501 in FIG. 5A. I/O interface 596 provides an interface between data latches 594 and the data bus 520.

During a read operation or other storage element sensing operation, a state machine, such as state machine 512 in FIG. 5A, controls the supply of different control gate voltages to the addressed storage elements. As it steps through the various predefined control gate voltages corresponding to the various memory states supported by the memory, the sense module 580 may trip at one of these voltages and an output will be provided from sense module 580 to processor 592 via bus 572. At that point, processor 592 determines the resultant memory state by consideration of the tripping event(s) of the sense module and the information about the applied control gate voltage from the state machine via input lines 593. It then computes a binary encoding for the memory state and stores the resultant data bits into data latches 594. In another embodiment of the core portion, bit line latch 582 serves both as a latch for latching the output of the sense module 580 and as a bit line latch as described above.

During a programming operation, the data to be programmed is stored in the set of data latches 594. The programming operation, under the control of the state machine 512, comprises a series of programming voltage pulses applied to the control gates of the addressed storage elements. Each program pulse is followed by a read back (or verify process) to determine if the storage element has been programmed to the desired memory state. Processor 592 monitors the read back memory state relative to the desired memory state. When the two are in agreement, the processor 592 sets the bit line latch 582 so as to cause the bit line to be pulled to a state designating program inhibit voltage. This inhibits the storage element coupled to the bit line from further programming even if program pulses appear on its control gate. In other embodiments, the processor initially loads the bit line latch 582 and the sense circuitry sets it to an inhibit value during the verify process.

Data latch stack 594 contains a stack of data latches corresponding to the sense module. In one embodiment, there are three data latches per sense module 580. The data latches can be implemented as a shift register so that the parallel data stored therein is converted to serial data for data bus 520, and vice-versa. All the data latches corresponding to a read/write block can be linked together to form a block shift register so that a block of data can be input or output by serial transfer. In particular, the bank of read/write modules may be configured such that each of its set of data latches will shift data in to or out of the data bus in sequence as if they are part of a shift register for the entire read/write block.

In some embodiments, a non-volatile storage system, such as non-volatile storage system 596 in FIG. 5A, may be implemented using an integrated circuit. The integrated circuit may include on-chip circuitry to generate a boosted voltage having a magnitude that is greater than the highest power supply voltage provided to the integrated circuit. The boosted voltage may be used for providing power to portions of the electronic circuitry located on the integrated circuit. The boosted voltage may be generated using an on-chip charge pump system. In some cases, a charge pump system may be used to generate an output voltage that is greater than the highest supply voltage provided to the integrated circuit. In other cases, a charge pump system may be used to generate an output voltage that is less than the lowest supply voltage provided to the integrated circuit (e.g., a negative charge pump system may generate a voltage that is less than ground or VSS).

Figure 6A:
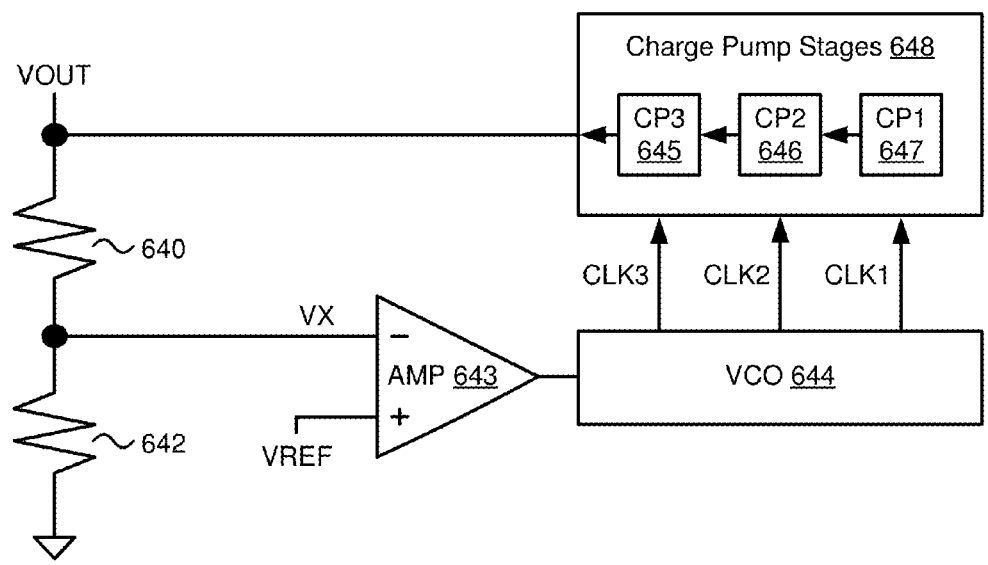
FIG. 6A depicts one embodiment of a charge pump system for generating voltages greater than a supply voltage.

FIG. 6A depicts one embodiment of a charge pump system for generating voltages greater than a supply voltage.

The supply voltage may be provided via an external voltage source that is external to an integrated circuit incorporating the charge pump system or via a voltage regulator that is located outside of the integrated circuit. As depicted, the charge pump system includes one or more charge pump stages 648, a comparator AMP 643, a voltage controlled oscillator VCO 644, and a voltage divider formed by resistors 640 and 642. The output voltage of the charge pump system, VOUT, may be used as an input voltage to on-chip voltage regulators in order to provide various voltage references to a memory array (e.g., selected word line voltages, unselected word line voltages, selected bit line voltages, and unselected bit line voltages). As depicted, a reference voltage VREF (e.g., 1.25V) is used as an input to comparator AMP 643. Due to closed-loop feedback, the voltage at node VX will be close to (or substantially the same as) VREF and the voltage at node VOUT will be a multiplier higher than the voltage at node VX due to the voltage divider formed by resistors 640 and 642.

The comparator AMP 643 drives the voltage controlled oscillator VCO 644. VCO 644 generates a plurality of clock signals, such as CLK1, CLK2, and CLK3. The output of comparator AMP 643 may adjust a frequency of the plurality of clock signals. In one example, if the voltage at node VX is less than the VREF voltage, then the output of comparator AMP 643 may cause the VCO 644 to increase the frequency of the plurality of clock signals. The VCO 644 drives the one or more charge pump stages 648 that generate voltages higher than the supply voltage provided. As depicted, the one or more charge pump stages 648 include three charge pump stages CP1 647, CP2 646, and CP3 645. CP1 647 may be used to boost an input voltage (e.g., the supply voltage) to a first voltage, CP2 646 may be used to boost the first voltage to a second voltage, and CP3 645 may be used to boost the second voltage to the output voltage. Each charge pump stage of the one or more charge pump stages may include a pair of diodes, a pair of diode-connected transistors, a pair of transistors, or a pair of charge transfer switches. Resistor and/or transistor trimming options for the voltage divider formed by resistors 640 and 642 may be used to modify the resulting output voltage VOUT. The reference voltage VREF may comprise a temperature insensitive reference voltage or a temperature dependent reference voltage. In one embodiment, VREF may be generated using a bandgap voltage reference or be derived from a bandgap-based voltage reference.

In some embodiments, a charge pump stage of the one or more charge pump stages 648 (e.g., CP1 647) may include a plurality of boosting capacitors that are arranged in series and charged to a charging voltage during a charging phase. In this case, during the charging phase, each boosting capacitor of the plurality of boosting capacitors may be charged to a fraction of the charging voltage applied across the plurality of boosting capacitors depending on the capacitive voltage divider formed by the plurality of boosting capacitors in series. After the charging phase, the plurality of boosting capacitors may be arranged in parallel and each boosting capacitor of the plurality of boosting capacitors may be boosted during a boosting phase. In one example, a boosting capacitor of the plurality of boosting capacitors may be boosted by the supply voltage (e.g., 2.15V or 2.45V) by changing a voltage applied to the end of the boosting capacitor not connected to the output of the charge pump stage from ground to the supply voltage.

In one embodiment, to meet a target output voltage of 2.7V using a 2.15V supply voltage, the one or more charge pump stages 648 may comprise a charge pump stage that includes two boosting capacitors that are arranged in series during a charging phase and that are arranged in parallel during a boosting phase. In this case, if the two boosting capacitors of the charge pump stage are charged to half of the supply voltage during the charging phase (i.e., both are charged up to 1.075V due to the series configuration) and then boosted by the supply voltage during the boosting phase, then the maximum output voltage for the target output voltage would be 3.225V (i.e., 2.15V+1.075V).

Figure 6B:
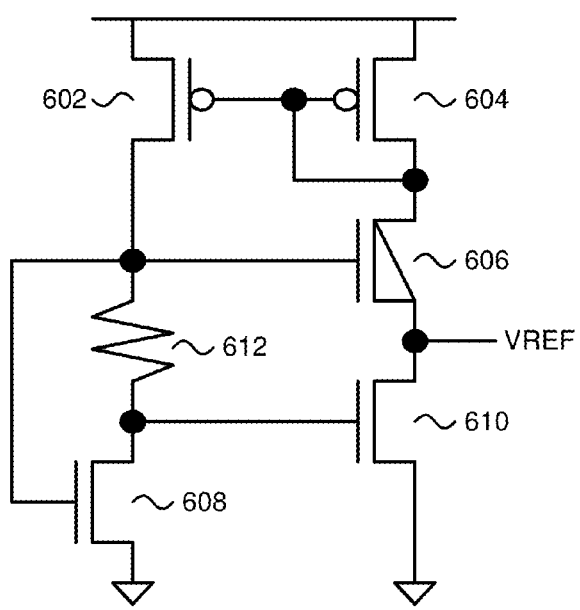
FIG. 6B depicts one embodiment of a voltage reference generator.

FIG. 6B depicts one embodiment of a voltage reference generator including transistors 602-610 and resistor 612 for generating a reference voltage, such as VREF in FIG. 6A. Transistors 608 and 610 comprise nMOS transistors. Transistors 602 and 604 comprise pMOS transistors in a current mirror configuration. Transistor 606 comprises a low VT nMOS transistor. As depicted, the voltage reference generator generates and combines a proportional to absolute temperature (PTAT) voltage and a complementary to absolute temperature (CTAT) voltage based on a difference in transistor VTs between transistor 608 and transistor 606. By modifying the degree to which the PTAT voltage and the CTAT voltage are combined, a resulting output voltage may be created that is either PTAT, CTAT, or substantially independent of temperature. In one embodiment, the devices are sized such that VREF provides a temperature insensitive reference voltage. Resistor and transistor trimming options may be used to modify the resulting output voltage and its slope over temperature. One benefit of using a voltage reference generator based on a difference in transistor VTs is that, unlike voltage references based on the base-emitter voltage of a bipolar junction transistor (e.g., a bandgap voltage reference), reference voltages may be generated over a wide range of temperatures using a sub-1V voltage supply. More information regarding voltage reference generation may be found in U.S. Pat. No. 7,999,529, "Methods and Apparatus for Generating Voltage References Using Transistor Threshold Differences."

Figure 6C:
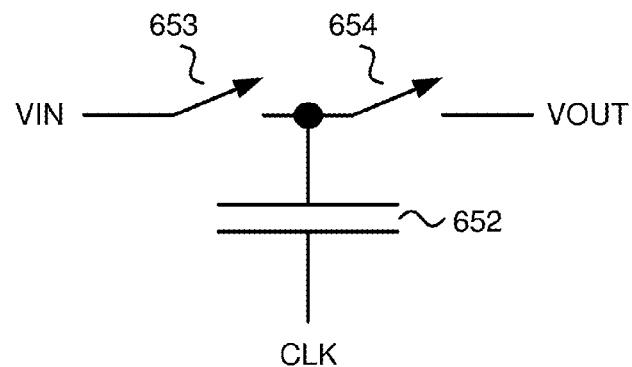
FIG. 6C depicts one embodiment of a charge pump stage including a boosting capacitor and a pair of switches.

FIG. 6C depicts one embodiment of a charge pump stage including a boosting capacitor 652 and a pair of switches 653-654. In one embodiment, each switch of the pair of switches 653-654 may be implemented using one or more transistors (e.g., an nMOS or pMOS transistor) or a charge transfer switch. A clock signal CLK may be connected to one end of the boosting capacitor 652 and may be set to ground or 0V during a charging phase in which the boosting capacitor 652 is charged up and set to VSUP (e.g., 2.7V) during a boosting phase in which the boosting capacitor 652 is connected to the output of the charge pump stage VOUT. In this case, when the clock signal CLK is low (e.g., 0V), then the charge pump stage may be in a charging phase. Conversely, when the clock signal CLK is high (e.g., 2.7V), then the charge pump stage may be in a boosting phase.

Figure 6D:
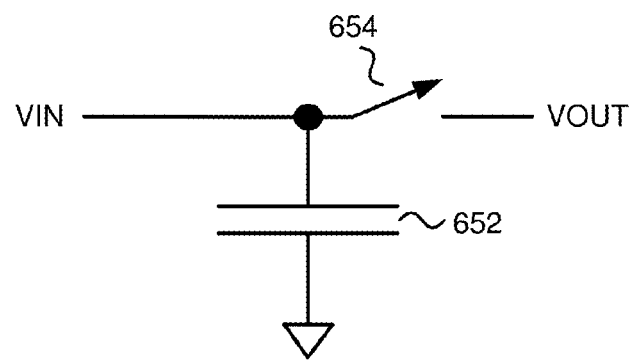
FIG. 6D depicts one embodiment of the charge pump stage of FIG. 6C during a charging phase.

FIG. 6D depicts one embodiment of the charge pump stage of FIG. 6C during a charging phase. During the charging phase, switch 654 is set into a non-conducting state causing the output VOUT to be disconnected from the boosting capacitor 652 and switch 653 is set into a conducting state causing the boosting capacitor 652 to be charged up to a charging voltage of VIN. The input VIN may derive from a supply voltage or from the output of a previous charge pump stage.

Figure 6E:
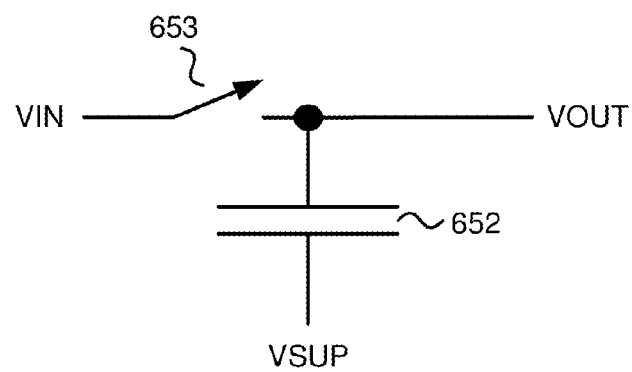
FIG. 6E depicts one embodiment of the charge pump stage of FIG. 6C during a boosting phase.

FIG. 6E depicts one embodiment of the charge pump stage of FIG. 6C during a boosting phase. During the boosting phase, switch 653 is set into a non-conducting state causing the input VIN to be disconnected from the boosting capacitor 652 and switch 654 is set into a conducting state causing the boosting capacitor 652 to be connected the output VOUT. During the boosting phase, as the clock signal CLK is raised from ground to VSUP, the boosting capacitor 652 may be boosted such that the output VOUT reaches a voltage that is greater than the charging voltage of VIN.

Figure 7A:
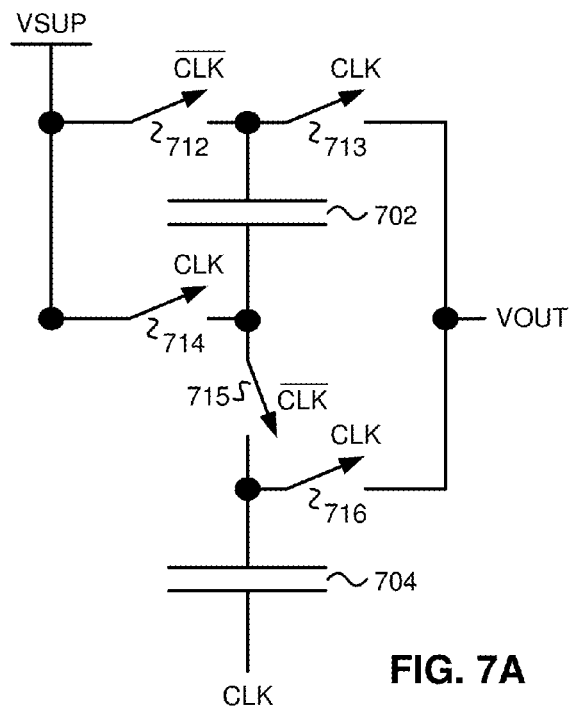
FIG. 7A depicts one embodiment of a charge pump stage including a plurality of boosting capacitors.

FIG. 7A depicts one embodiment of a charge pump stage including a plurality of boosting capacitors and switches 712-716. The switches 712-716 may be controlled using clock signals, such as CLK and the inverse of CLK (or CLK_bar). The switches 712-716 may be implemented using transistors (e.g., nMOS or pMOS transistors) or charge transfer switches. As depicted, the plurality of boosting capacitors includes a first boosting capacitor 702 and a second boosting capacitor 704. When the clock signal CLK is low (e.g., 0V), then the charge pump stage may be in a charging phase with the first boosting capacitor 702 arranged in series with the second boosting capacitor 704. When the clock signal CLK is high (e.g., 2.7V), then the charge pump stage may be in a boosting phase with the first boosting capacitor 702 arranged in parallel with the second boosting capacitor 704.

Figure 7B:
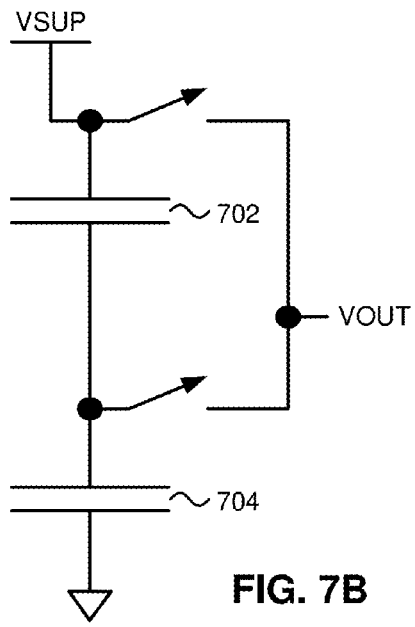
FIG. 7B depicts one embodiment of the charge pump stage of FIG. 7A during a charging phase.

FIG. 7B depicts one embodiment of the charge pump stage of FIG. 7A during a charging phase. During the charging phase, switches 713-714 and 716 are set into a non-conducting state and switches 712 and 715 are set into a conducting state causing the first boosting capacitor 702 and the second capacitor 704 to be placed in series and causing the supply voltage VSUP to be connected to one end of the first boosting capacitor 702. As the first boosting capacitor 702 is in series with the second boosting capacitor 704 during the charging phase, both the first boosting capacitor 702 and the second boosting capacitor 704 will be charged up to a voltage less than the supply voltage VSUP or to a voltage that is a fraction of the supply voltage VSUP. In some cases, during the charging phase, the charging of the series combination of the first boosting capacitor 702 and the second boosting capacitor 704 to a charging voltage (e.g., to VSUP or another voltage used as an input to the charge pump stage) may cause the first boosting capacitor 702 to be charged up to a first voltage that is less than the charging voltage and the second boosting capacitor 704 to be charged up to a second voltage that is less than the charging voltage. In one example, the first voltage may be equal to or substantially the same as the second voltage. In another example, the first voltage may be greater than the second voltage or less than the second voltage (e.g., in cases where the boosting capacitors do not have equal capacitances).

Figure 7C:
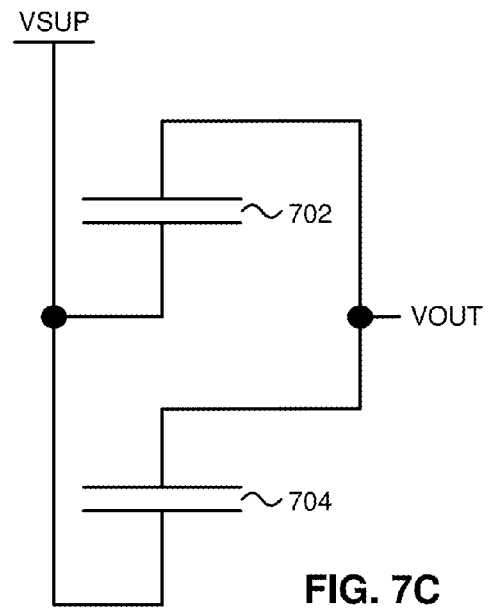
FIG. 7C depicts one embodiment of the charge pump stage of FIG. 7A during a boosting phase.

FIG. 7C depicts one embodiment of the charge pump stage of FIG. 7A during a boosting phase. During the boosting phase, switches 712 and 715 are set into a non-conducting state and switches 713, 714, and 716 are set into a conducting state causing the first boosting capacitor 702 and the second boosting capacitor 704 to be arranged in parallel and both connected to the output of the charge pump stage VOUT. During the boosting phase, the first boosting capacitor 702 and the second boosting capacitor 704 are boosted by the supply voltage VSUP. In one example, if the first boosting capacitor 702 and the second boosting capacitor 704 are of equal capacitance and the supply voltage VSUP comprises 3V, then during the charging phase both the first boosting capacitor 702 and the second boosting capacitor 704 may be charged to 1.5V (i.e., half of the supply voltage of 3V). Then, during the boosting phase, both the first boosting capacitor 702 and the second boosting capacitor 704 are arranged in parallel and boosted by the supply voltage of 3V. In this case, the maximum output voltage for the charge pump stage would be 4.5V.

Figure 7D:
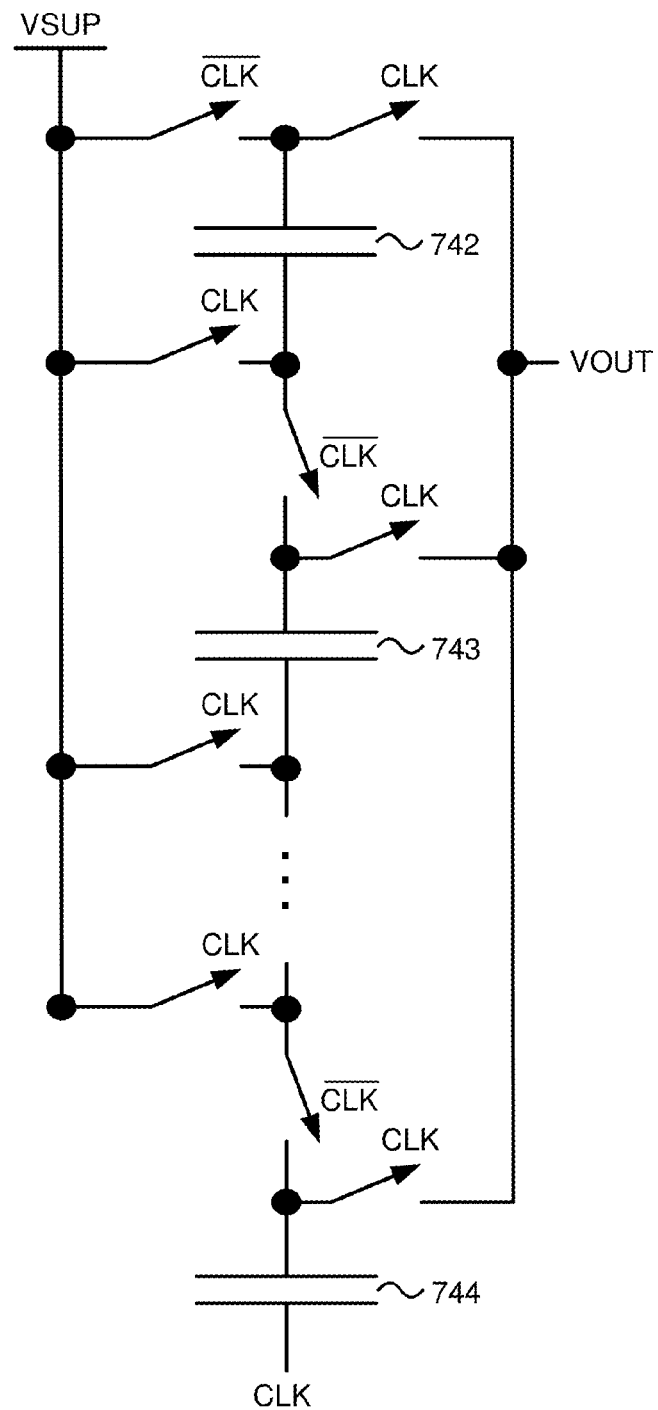
FIG. 7D depicts another embodiment of a charge pump stage including a plurality of boosting capacitors.

FIG. 7D depicts one embodiment of a charge pump stage including a plurality of boosting capacitors 742-744 and switches controlled using clock signals, such as CLK and the inverse of CLK (or CLK_bar). The switches for controlling the arrangement of the plurality of boosting capacitors 742-744 may be implemented using transistors (e.g., nMOS or pMOS transistors) or charge transfer switches. During a charging phase, the plurality of boosting capacitors may be placed in series with each other and charged up to the supply voltage VSUP. As the plurality of boosting capacitors are arranged in series, each of the plurality of boosting capacitors may be charged up to a voltage less than the supply voltage VSUP or to a voltage that is a fraction of the supply voltage VSUP. In the case of N boosting capacitors in series, the fraction of the supply voltage that each boosting capacitor is charged up to may comprise VSUP/N. After the charging phase, the plurality of boosting capacitors may be arranged in parallel and each boosting capacitor of the plurality of boosting capacitors may be boosted during a boosting phase in order to generate a voltage that is greater than the supply voltage VSUP.

Figure 7E:
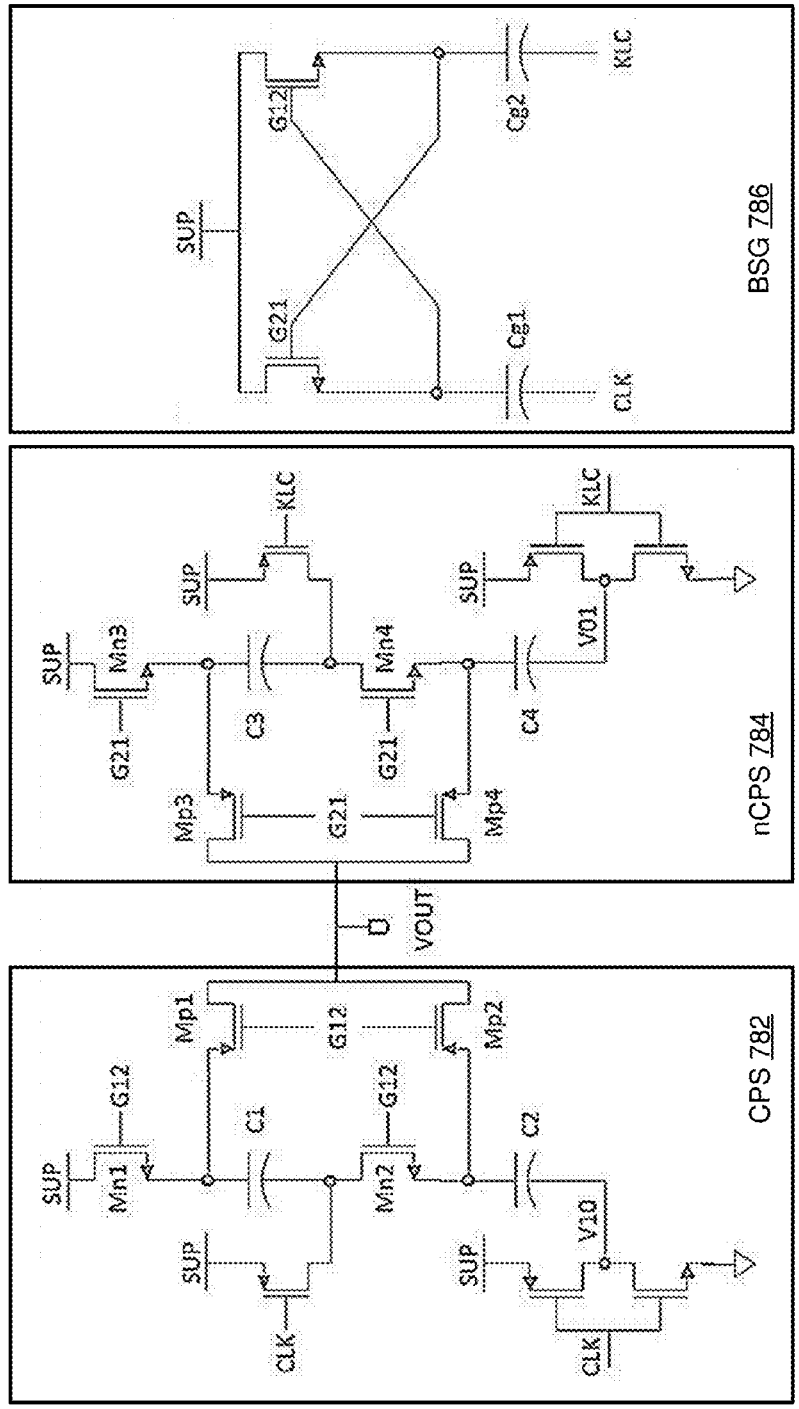
FIG. 7E depicts one embodiment of a portion of a charge pump system that includes a first charge pump stage and a second charge pump stage that is a dual of the first charge pump stage.

FIG. 7E depicts one embodiment of a portion of a charge pump system that includes a first charge pump stage CPS 782 and a second charge pump stage nCPS 784 that is a dual of the first charge pump stage CPS 782. In this case, when the first charge pump stage CPS 782 is in a charging phase, the second charge pump stage nCPS 784 may be in a boosting phase. Conversely, when the second charge pump stage nCPS 784 is in a charging phase, the first charge pump stage CPS 782 may be in a boosting phase. A boosted signal generator BSG 786 may be used to generate control signals for the gates of nMOS transistors to allow them to pass high voltages. When the first charge pump stage CPS 782 is in a charging phase, CLK may be high (e.g., 3V) and KLC (i.e., the inverse of CLK) may be low (e.g., 0V). In this case, node V10 is pulled to ground, signal G12 is boosted and used to set nMOS transistor Mn1 into a conducting state and to set boosting capacitors C1 and C2 in series via nMOS transistor Mn2. As signal G12 has been boosted (e.g., to 6V), the boosting capacitors C1 and C2 will each be charged up to half of the supply voltage SUP.

When the first charge pump stage CPS 782 is in the boosting phase, the second charge pump stage nCPS 784 may be in the charging phase. When the first charge pump stage CPS 782 is in the boosting phase, CLK may be low (e.g., 0V) and KLC (i.e., the inverse of CLK) may be high (e.g., 3V). In this case, the nMOS transistors Mn1 and Mn2 may be set into non-conducting states and the pMOS transistors Mp1 and Mp2 may be set into conducting states such that the boosting capacitors C1 and C2 are arranged in parallel and connected to the output VOUT. When the first charge pump stage CPS 782 is in the boosting phase, boosting capacitors C1 and C2 may be boosted by an amount equal to the supply voltage VSUP (e.g., by changing node V10 from 0V to VSUP).

In some cases, the output of the charge pump system may be used as an internal power supply for one or more on-chip voltage regulators that are used to provide various on-chip voltage references. In one example, a voltage regulator may be used to generate a regulated voltage (e.g., a selected word line voltage or a selected bit line voltage used for biasing a memory array during a memory operation). The voltage regulator may include a non-inverting amplifier and a unity gain buffer. The output of the charge pump system may be used as the power supply for the non-inverting amplifier and the unity gain buffer to generate the regulated voltage. The non-inverting amplifier may include a configurable resistor network (or ladder) that may be configured to generate the regulated voltage before being buffered by the unity gain buffer.

Figure 8A:
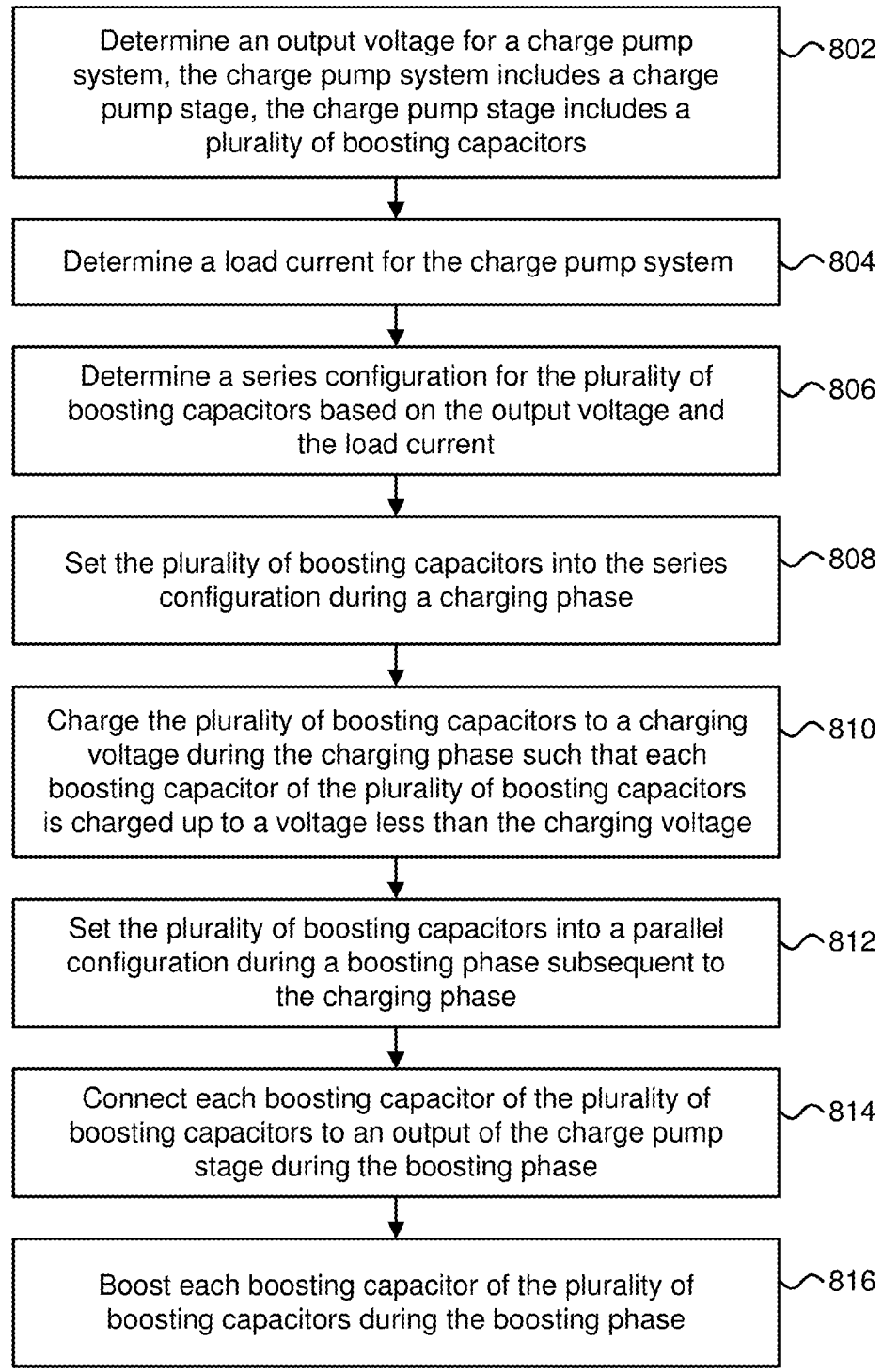
FIG. 8A is a flowchart describing one embodiment of a process for generating a voltage that is greater than a supply voltage using a charge pump system.

FIG. 8A is a flowchart describing one embodiment of a process for generating a voltage that is greater than a supply voltage using a charge pump system. In one embodiment, the process of FIG. 8A may be performed by a charge pump system, such as the charge pump system depicted in FIG. 6A. The process of FIG. 8A may be performed using a charge pump stage that includes a plurality of boosting capacitors, such as the charge pump stages depicted in FIG. 7A, FIG. 7D, or FIG. 7E.

In step 802, an output voltage for a charge pump system is determined. The output voltage for the charge pump system may comprise the target or desired output voltage for the charge pump system (e.g., 10V or 4V). The charge pump system may include one or more charge pump stages. A charge pump stage of the one or more charge pump stages may include a plurality of boosting capacitors. The output voltage for the charge pump system may be determined via a lookup table stored in a memory located on an integrated circuit or determined using control circuitry that selects the output voltage based on an operating mode for the integrated circuit. In one embodiment, one or more control circuits for facilitating one or more memory array operations to be performed on a memory array may determine the output voltage for the charge pump system based on a memory operation to be performed on the memory array (e.g., a read operation or a write operation). In one example, if the memory operation comprises a read operation, then the output voltage for the charge pump system may be set to a read voltage (e.g., 2.7V). In another example, if the memory operation comprises a write operation, then the output voltage for the charge pump system may be set to a write voltage (e.g., 10V).

In step 804, a load current for the charge pump system is determined. The load current may comprise the amount of current that must be provided by the charge pump system to a load when generating the output voltage. The load current for the charge pump system may be determined via a lookup table stored in a memory located on an integrated circuit or determined using control circuitry that selects the load current based on an operating mode for the integrated circuit.

In step 806, a series configuration for the plurality of boosting capacitors is determined based on the output voltage and the load current. In one embodiment, the series configuration may comprise arranging the plurality of boosting capacitors in series. In some embodiments, a configuration of the plurality of boosting capacitors during a charging phase may be set depending on the desired output voltage of the charge pump system. In one example, if the desired output voltage of the charge pump system is above a voltage threshold (e.g., above 3V), then the plurality of boosting capacitors may be placed in parallel during the charging phase. However, if the desired output voltage of the charge pump system is below the voltage threshold, then the plurality of boosting capacitors may be placed in series during the charging phase. In some cases, the number of boosting capacitors placed in series during the charging phase may depend on the desired output voltage. In one example, if the desired output voltage is 3V, then two boosting capacitors may be placed in series during the charging phase. However, if the desired output voltage is 2V or another voltage less than 3V, then three boosting capacitors may be placed in series during the charging phase. Thus, the number of boosting capacitors arranged in series during the charging phase may be set based on the desired output voltage of the charge pump system.

In step 808, the plurality of boosting capacitors is set into the series configuration during a charging phase. In one embodiment, during the charging phase, the plurality of boosting capacitors may be configured such that each boosting capacitor of the plurality of boosting capacitors is charged to a fraction of a charging voltage applied across the plurality of boosting capacitors (i.e., each boosting capacitor may be charged up to a voltage less than the charging voltage depending on the capacitive voltage divider formed by the plurality of boosting capacitors). In step 810, the plurality of boosting capacitors is charged to a charging voltage during the charging phase such that each boosting capacitor of the plurality of boosting capacitors is charged up to a voltage less than the charging voltage. In some cases, the charging voltage may be the same as the supply voltage. In one embodiment, the plurality of boosting capacitors may be charged to the charging voltage by connecting one end of the series configuration of the plurality of boosting capacitors to the supply voltage.

In step 812, the plurality of boosting capacitors is set into a parallel configuration during a boosting phase subsequent to the charging phase. In step 814, each boosting capacitor of the plurality of boosting capacitors is connected to an output of the charge pump stage during the boosting process. In step 816, each boosting capacitor of the plurality of boosting capacitors is boosted during the boosting phase. In one example, a boosting capacitor of the plurality of boosting capacitors may be boosted by the supply voltage by changing a voltage applied to an end of the boosting capacitor not connected to the output of the charge pump stage from ground to the supply voltage.

Figure 8B:
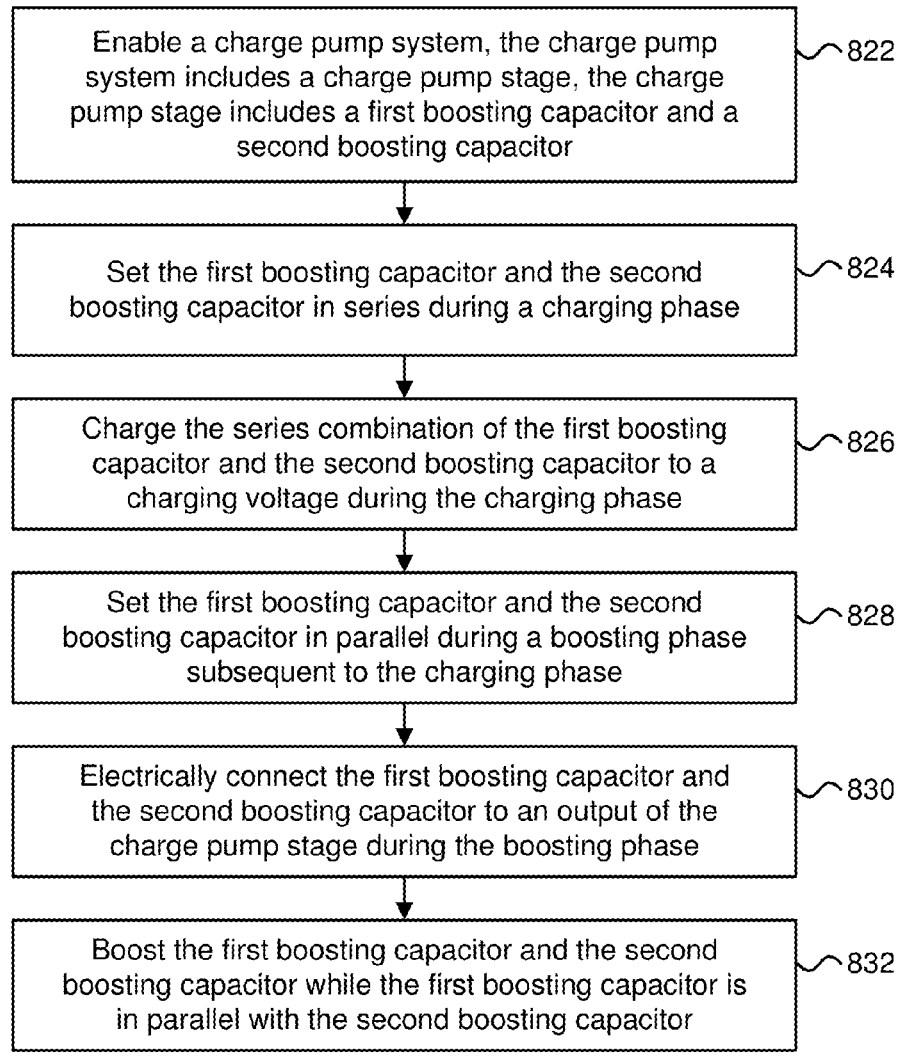
FIG. 8B is a flowchart describing an alternative embodiment of a process for generating a voltage that is greater than a supply voltage using a charge pump system.

FIG. 8B is a flowchart describing an alternative embodiment of a process for generating a voltage that is greater than a supply voltage using a charge pump system. In one embodiment, the process of FIG. 8B may be performed by a charge pump system, such as the charge pump system depicted in FIG. 6A. The process of FIG. 8B may be performed using a charge pump stage that includes a plurality of boosting capacitors, such as the charge pump stages depicted in FIG. 7A, FIG. 7D, or FIG. 7E.

In step 822, a charge pump system is enabled for operation. The charge pump system may include a charge pump stage. The charge pump stage may include a first boosting capacitor and a second boosting capacitor. The first boosting capacitor may be formed using silicon dioxide as the dielectric and polysilicon for one of the capacitor plates. In one example, the first boosting capacitor may comprise an MOS capacitor. The first boosting capacitor may comprise a parallel plate capacitor, an integrated capacitor, an on-chip capacitor, a capacitor formed using one or more transistors, or a capacitor formed using a gate dielectric. In step 824, the first boosting capacitor and the second boosting capacitor are set or arranged in series with each other during a charging phase. In step 826, the series combination of the first boosting capacitor and the second boosting capacitor is charged up to a charging voltage during the charging phase. In step 828, the first boosting capacitor and the second boosting capacitor are set or arranged in parallel during a boosting phase that is subsequent to the charging phase. In step 830, the first boosting capacitor and the second boosting capacitor are electrically connected to an output of the charge pump stage during the boosting stage. In step 832, the first boosting capacitor and the second boosting capacitor are boosted while the first boosting capacitor is in parallel with the second boosting capacitor. In one example, the first boosting capacitor may be boosted by changing a voltage applied to a first end of the first boosting capacitor not connected to the output of the charge pump stage from ground to a supply voltage and the second boosting capacitor may be boosted by changing a voltage applied to a second end of the second boosting capacitor not connected to the output of the charge pump stage from ground to the supply voltage.

One embodiment of the disclosed technology includes a plurality of boosting capacitors and a plurality of switches. The plurality of switches configured to set the plurality of boosting capacitors into a series configuration during a charging phase of a charge pump stage of a charge pump system. The plurality of switches configured to charge the plurality of boosting capacitors to a charging voltage during the charging phase such that each boosting capacitor of the plurality of boosting capacitors is charged to a voltage that is less than the charging voltage. The plurality of switches configured to set the plurality of boosting capacitors into a parallel configuration during a boosting phase subsequent to the charging phase. The plurality of switches configured to connect each boosting capacitor of the plurality of boosting capacitors to an output of the charge pump stage during the boosting phase. The plurality of switches configured to cause each boosting capacitor of the plurality of boosting capacitors to be boosted during the boosting phase. In some cases, the series configuration may comprise a first boosting capacitor of the plurality of boosting capacitors placed in series with a second boosting capacitor of the plurality of boosting capacitors.

One embodiment of the disclosed technology includes setting a plurality of boosting capacitors into a series configuration during a charging phase of a charge pump stage, charging the plurality of boosting capacitors to a charging voltage during the charging phase such that each boosting capacitor of the plurality of boosting capacitors is charged to a voltage that is less than the charging voltage, setting the plurality of boosting capacitors into a parallel configuration during a boosting phase subsequent to the charging phase, connecting each boosting capacitor of the plurality of boosting capacitors to an output of the charge pump stage during the boosting phase, and boosting each boosting capacitor of the plurality of boosting capacitors during the boosting phase.

One embodiment of the disclosed technology includes setting a first boosting capacitor in series with a second boosting capacitor during a charging phase of a charge pump stage of the charge pump system, charging the series combination of the first boosting capacitor and the second boosting capacitor to a charging voltage during the charging phase such that the first boosting capacitor is charged to a first voltage less than the charging voltage and the second boosting capacitor is charged to a second voltage less than the charging voltage, setting the first boosting capacitor and the second boosting capacitor in parallel during a boosting phase subsequent to the charging phase, connecting a first end of the first boosting capacitor to an output of the charge pump stage during the boosting phase, and transitioning a voltage applied to a second end of the first boosting capacitor from a first voltage to a second voltage greater than the first voltage.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A charge pump system for generating an output voltage greater than an input voltage, comprising:
    a plurality of capacitors; and
    a plurality of switches configured to set the plurality of capacitors into a series configuration during a charging phase of a charge pump stage of the charge pump in response to a level of said output voltage and the plurality of switches configured to charge each of the plurality of capacitors to a fraction of the input voltage during the charging phase, the plurality of switches configured to set the plurality of capacitors into a parallel configuration during a boosting phase subsequent to the charging phase, the plurality of switches configured to connect each boosting capacitor of the plurality of capacitors to an output of the charge pump stage during the boosting phase to provide an output voltage greater than the input voltage, the plurality of switches configured to cause each boosting capacitor of the plurality of capacitors to be boosted during the boosting phase based on the output voltage.

2. The charge pump system of claim 1, wherein:
    the series configuration includes a first boosting capacitor of the plurality of capacitors in series with a second boosting capacitor of the plurality of capacitors; and
    the plurality of switches configured to charge the plurality of capacitors to the input voltage during the charging phase such that each boosting capacitor of the plurality of capacitors is charged to a voltage that is less than the input voltage.

3. The charge pump system of claim 1, wherein:
    the plurality of switches comprises a first transistor and a second transistor, the first transistor configured to connect a first end of a first boosting capacitor of the plurality of capacitors to the output of the charge pump stage during the boosting phase, the second transistor configured to connect a second end of the first boosting capacitor to a supply voltage during the boosting phase.

4. The charge pump system of claim 1, further comprising:
one or more control circuits configured to determine a target output voltage for the output of the charge pump stage and configured to determine the series configuration for the plurality of capacitors based on the target output voltage.

5. The charge pump system of claim 1, further comprising:
one or more control circuits configured to determine a load current for the output of the charge pump stage and configured to determine the series configuration for the plurality of capacitors based on the load current.

6. The charge pump system of claim 1, wherein:
the plurality of switches comprises a plurality of transistors;
the plurality of capacitors comprises integrated capacitors; and
the charge pump system is arranged on an integrated circuit, the input voltage comprises a supply voltage that is provided to the integrated circuit from a voltage source that is outside the integrated circuit.

7. The charge pump system of claim 1, wherein:
the charge pump system is arranged on an integrated circuit, the output of the charge pump stage is used for biasing a memory array arranged on the integrated circuit, the memory array is monolithically formed in one or more physical levels of memory cells having active areas disposed above a silicon substrate.

8. A charge pump system for generating an output voltage greater than an input voltage, comprising:
means for setting a plurality of boosting capacitors into a series configuration during a charging phase of a charge pump stage of the charge pump system in response to a level of the output voltage;
means for charging each of the plurality of boosting capacitors to a fraction of a charging voltage during the charging phase such that each boosting capacitor of the plurality of boosting capacitors is charged to a voltage that is less than the charging voltage;
means for setting the plurality of boosting capacitors into a parallel configuration during a boosting phase subsequent to the charging phase; and
means for boosting each boosting capacitor of the plurality of boosting capacitors during the boosting phase such that an output of the charge pump stage is boosted to a voltage greater than the charging voltage.

9. The charge pump system of claim 8, wherein:
the setting a plurality of boosting capacitors into a series configuration during the charging phase includes arranging a first boosting capacitor of the plurality of boosting capacitors in series with a second boosting capacitor of the plurality of boosting capacitors during the charging phase.

10. The charge pump system of claim 8, further comprising:
means for connecting each boosting capacitor of the plurality of boosting capacitors to the output of the charge pump stage during the boosting phase, the connecting each boosting capacitor of the plurality of boosting capacitors to the output of the charge pump stage includes connecting a first end of a first boosting capacitor of the plurality of boosting capacitors to the output of the charge pump stage; and
the boosting each boosting capacitor of the plurality of boosting capacitors during the boosting phase includes transitioning a voltage applied to a second end of the first boosting capacitor of the plurality of boosting capacitors from a first voltage to a second voltage greater than the first voltage.

11. The charge pump system of claim 10, wherein:
the charge pump stage is arranged on an integrated circuit, the second voltage comprises a supply voltage that is provided to the integrated circuit from a voltage source that is outside of the integrated circuit.

12. The charge pump system of claim 8, further comprising:
means for determining a target output voltage for an output of the charge pump system;
means for determining the series configuration for the plurality of boosting capacitors based on the target output voltage; and
means for regulating the output of the charge pump system to the target output voltage.

13. The charge pump system of claim 12, wherein:
the determining the series configuration for the plurality of boosting capacitors includes determining a number of boosting capacitors to be arranged in series based on the target output voltage.

14. The charge pump system of claim 8, further comprising:
means for determining a load current for an output of the charge pump system; and
means for determining the series configuration for the plurality of boosting capacitors based on the load current.

15. The charge pump system of claim 8, wherein:
the plurality of boosting capacitors comprises a plurality of MOS capacitors; and
the charge pump stage is arranged on an integrated circuit, the charging voltage comprises a supply voltage that is provided to the integrated circuit from a voltage source that is located outside of the integrated circuit, the integrated circuit comprises a memory chip.

16. The charge pump system of claim 8, wherein:
the charge pump stage is arranged on an integrated circuit, the output of the charge pump stage is used for biasing a memory array arranged on the integrated circuit, the memory array is monolithically formed in one or more physical levels of memory cells having active areas disposed above a silicon substrate.

17. A method for operating a charge pump system for generating an output voltage greater than an input voltage, comprising:
setting a first boosting capacitor in series with a second boosting capacitor during a charging phase of a charge pump stage of the charge pump system in response to a level of the output voltage;
charging the series combination of the first boosting capacitor and the second boosting capacitor to a charging voltage during the charging phase such that the first boosting capacitor is charged to a first voltage less than the charging voltage and the second boosting capacitor is charged to a second voltage less than the charging voltage;
setting the first boosting capacitor and the second boosting capacitor in parallel during a boosting phase subsequent to the charging phase;
connecting a first end of the first boosting capacitor to an output of the charge pump stage during the boosting phase; and
transitioning a voltage applied to a second end of the first boosting capacitor from a first voltage to a second voltage greater than the first voltage such that the output of the charge pump stage is boosted to a voltage greater than the charging voltage.

18. The method of claim 17, wherein:

the charge pump system is arranged on an integrated circuit, the second voltage comprises a supply voltage that is provided to the integrated circuit from a voltage source that is located outside of the integrated circuit.

19. The method of claim 17, wherein:

the transitioning a voltage applied to a second end of the first boosting capacitor includes transitioning a clock signal connected to the second end of the first boosting capacitor during the boosting phase from the first voltage to the second voltage.

20. The method of claim 17, wherein:

the charge pump system includes a plurality of charge pump stages, the plurality of charge pump stages includes the charge pump stage;

the charge pump system is arranged on an integrated circuit, the charging voltage comprises a supply voltage that is provided to the integrated circuit from a voltage source that is located outside of the integrated circuit; and the output of the charge pump stage is used for biasing a memory array arranged on the integrated circuit, the memory array is monolithically formed in one or more physical levels of memory cells having active areas disposed above a silicon substrate.

* * * * *